United States Patent
Gao et al.

(10) Patent No.: US 9,951,858 B2
(45) Date of Patent: Apr. 24, 2018

(54) THERMAL BYPASS VALVE USING SHAPE MEMORY ALLOYS

(71) Applicants: GM GLOBAL TECHNOLOGY OPERATIONS LLC, Detroit, MI (US); DYNALLOY, INC., Tustin, CA (US)

(72) Inventors: Xiujie Gao, Troy, MI (US); Nancy L. Johnson, Northville, MI (US); Ronald R. Semel, West Bloomfield, MI (US); James Holbrook Brown, Temecula, CA (US)

(73) Assignees: GM Global Technology Operations LLC, Detroit, MI (US); Dynalloy, INC., Tustinn, CA (US)

( * ) Notice: Subject to any disclaimer, the term of this patent is extended or adjusted under 35 U.S.C. 154(b) by 517 days.

(21) Appl. No.: 14/612,964

(22) Filed: Feb. 3, 2015

(65) Prior Publication Data

US 2015/0233465 A1    Aug. 20, 2015

Related U.S. Application Data

(60) Provisional application No. 61/939,866, filed on Feb. 14, 2014.

(51) Int. Cl.
*F01P 7/02* (2006.01)
*G05D 11/00* (2006.01)
(Continued)

(52) U.S. Cl.
CPC ......... *F16H 57/0413* (2013.01); *F01M 5/007* (2013.01)

(58) Field of Classification Search
CPC ............................ F01M 5/007; F16H 57/0413
(Continued)

(56) References Cited

U.S. PATENT DOCUMENTS 3,873,044 A * 3/1975 Flower ................... B65H 59/36
                                                          242/147 R
3,913,831 A * 10/1975 Talak ..................... F01M 5/007
                                                          137/625.29
(Continued)

FOREIGN PATENT DOCUMENTS

| CN | 102954198 A | 3/2013 |
| CN | 103133671 A | 6/2013 |

(Continued)

*Primary Examiner* — Henry Crenshaw
(74) *Attorney, Agent, or Firm* — Quinn IP Law

(57) ABSTRACT

A transmission fluid circuit for regulating the flow of a fluid includes a transmission, a cooler, and a valve. The valve includes a housing, a spool, and an actuator including a smart material. The spool is movable inside the housing between a first position and a second position. The smart material is configured to be in an activated state in response to the fluid exhibiting at least a first temperature and to be in a deactivated state in response to the fluid being a sufficient number of degrees less than the first temperature. The fluid flows from the housing to the transmission and from the transmission to the housing when the spool is in the first position. The fluid flows from the housing to the cooler, from the cooler to the transmission, and from the transmission to the housing when the spool is in the second position.

3 Claims, 3 Drawing Sheets

(51) Int. Cl.
   *F16K 49/00*   (2006.01)
   *F16K 17/38*   (2006.01)
   *F01B 29/00*   (2006.01)
   *F16H 57/04*   (2010.01)
   *F01M 5/00*    (2006.01)

(58) Field of Classification Search
   USPC ...... 137/115.26, 334, 468; 236/34.5; 60/527
   See application file for complete search history.

(56) References Cited

U.S. PATENT DOCUMENTS

| | | | |
|---|---|---|---|
| 4,190,198 | A | 2/1980 | Casuga et al. |
| 4,522,219 | A | 6/1985 | Ohkata |
| 5,211,371 | A * | 5/1993 | Coffee ................. F16K 31/002 251/11 |
| 5,890,509 | A * | 4/1999 | Becker ................. F15B 21/045 137/115.26 |
| 6,871,703 | B2 * | 3/2005 | Kemmerer ......... F16H 57/0413 165/103 |
| 7,997,505 | B2 | 8/2011 | Martin et al. |
| 2007/0228309 | A1 * | 10/2007 | Friedman ............. F16K 11/044 251/65 |
| 2008/0029246 | A1 | 2/2008 | Fratantonio et al. |
| 2008/0034749 | A1 * | 2/2008 | Ukpai .................... F03G 7/065 60/527 |
| 2008/0034750 | A1 * | 2/2008 | Gao ........................ F03G 7/065 60/527 |
| 2008/0100071 | A1 * | 5/2008 | Browne ............... B62D 25/182 292/341.17 |
| 2009/0178397 | A1 * | 7/2009 | Mankame ............ F15B 21/045 60/329 |
| 2009/0299502 | A1 * | 12/2009 | Mankame .............. G05B 11/32 700/68 |
| 2013/0042927 | A1 * | 2/2013 | Neelakantan ....... F16H 57/0413 137/334 |
| 2013/0139906 | A1 * | 6/2013 | Neelakantan .......... F16K 11/07 137/334 |
| 2013/0146155 | A1 * | 6/2013 | Gilbertson ............. F16K 31/12 137/468 |

FOREIGN PATENT DOCUMENTS

| | | |
|---|---|---|
| CN | 103174862 A | 6/2013 |
| EP | 1302711 A1 | 4/2003 |
| WO | 2008022874 A1 | 2/2008 |

* cited by examiner

THERMAL BYPASS VALVE USING SHAPE MEMORY ALLOYS

CROSS-REFERENCE TO RELATED APPLICATIONS

This application claims the benefit of U.S. Provisional Application No. 61/939,866, filed Feb. 14, 2014, which is hereby incorporated by reference in its entirety.

TECHNICAL FIELD

The disclosure relates to a transmission fluid circuit.

BACKGROUND

Vehicles typically include an engine and a transmission. To operate properly, the transmission requires a supply of fluid, such as transmission oil. The fluid may be used for such functions as cooling and lubrication. The lubricating and cooling capabilities of transmission oil systems greatly impact the reliability and durability of the transmission. Additionally, multi-speed power transmissions require fluid for controlled engagement and disengagement, on a desired schedule, of the various torque transmitting mechanisms that operate to establish the speed ratios within the internal gear arrangement.

SUMMARY

The present disclosure provides a transmission fluid circuit for regulating a flow of a fluid. A first embodiment of the transmission fluid circuit includes a transmission, a cooler, and a valve. The transmission is configured for receiving and expelling the fluid. The cooler is configured for receiving and expelling the fluid. The valve is configured for directing the flow of the fluid received from the transmission to one of the transmission and the cooler. The valve includes a housing, a spool, and an actuator. The housing defines a cavity extending longitudinally between a first end and a second end. The cavity is configured for receiving and expelling the fluid. The spool is disposed in the cavity and is movable longitudinally therein between a first position and a second position. The actuator is attached to the spool and includes a smart material configured as a straight wire and disposed in the fluid. The actuator is configured to move the spool between the first position and the second position. The smart material is configured to be in an activated state in response to the fluid being at least a first temperature such that the activated smart material causes the actuator to move the spool to the second position. The smart material is configured to be in a deactivated state in response to the fluid being a sufficient number of degrees less than the first temperature such that the deactivated smart material causes the actuator to move the spool to the first position. The fluid is permitted to flow from the cavity to the transmission and from the transmission to the cavity when the spool is in the first position. The fluid is permitted to flow from the cavity to the cooler, from the cooler to the transmission, and from the transmission to the cavity when the spool is in the second position.

A second embodiment of the transmission fluid circuit for regulating a flow of a fluid includes a transmission, a cooler, and a valve. The transmission is configured for receiving and expelling the fluid. The cooler is configured for receiving and expelling the fluid. The valve is configured for directing the flow of the fluid received from the transmission to one of the transmission and the cooler. The valve includes a housing, a hollow shuttle, and an actuator. The housing defines a cavity having a closed end and an open end. The cavity extends longitudinally between the closed end and the open end. The cavity is configured for receiving and expelling the fluid. The hollow shuttle has a closed end and is configured to form an open end and a hole. The hollow shuttle is disposed in the cavity and is movable longitudinally therein between a first position and a second position. The actuator is attached to the hollow shuttle and includes a smart material configured as a straight wire and disposed in the fluid. The actuator is configured to move the hollow shuttle between the first position and the second position. The smart material is configured to be in an activated state in response to the fluid exhibiting at least a first temperature such that activated smart material causes the actuator to move the hollow shuttle to the second position. The smart material is configured to be in a deactivated state in response to the fluid being a sufficient number of degrees less than the first temperature such that the deactivated smart material causes the actuator to move the hollow shuttle to the first position. The fluid is permitted to flow from the cavity to the transmission and from the transmission to the cavity when the hollow shuttle is in the first position. The fluid is permitted to flow from the cavity to the cooler, from the cooler to the transmission, and from the transmission to the cavity when the hollow shuttle is in the second position. The hollow shuttle may be further configured to form a slot.

A third embodiment of the transmission fluid circuit for regulating a flow of a fluid includes a transmission, a cooler, and a valve. The transmission is configured for receiving and expelling the fluid. The cooler is configured for receiving and expelling the fluid. The valve is configured for directing the flow of the fluid received from the transmission to one of the transmission and the cooler. The valve includes a housing, a hollow shuttle, and an actuator. The housing defines a cavity having a first open end and a second open end. The cavity extending longitudinally between the first open end and the second open end and is configured for receiving and expelling the fluid. The hollow shuttle has a closed end and is configured to form an open end and a hole. The hollow shuttle is disposed in the cavity and is movable longitudinally therein between a first position and a second position. The actuator is attached to the hollow shuttle and includes a smart material configured as a straight wire and disposed in the fluid. The actuator is configured to move the hollow shuttle between the first position and the second position. The smart material is configured to be in an activated state in response to fluid exhibiting at least a first temperature such that the activated smart material causes the actuator to move the hollow shuttle to the second position. The smart material is configured to be in a deactivated state in response to the fluid being a sufficient number of degrees less than the first temperature such that the deactivated smart material causes the actuator to move the hollow shuttle to the first position. The fluid is permitted to flow from the cavity to the transmission and from the transmission to the cavity when the hollow shuttle is in the first position. The fluid is permitted to flow from the cavity to the cooler, from the cooler to the transmission, and from the transmission to the cavity when the hollow shuttle is in the second position. The hollow shuttle may be further configured to form a slot.

The above features and advantages and other features and advantages of the present teachings are readily apparent from the following detailed description of the best modes for carrying out the present teachings when taken in connection with the accompanying drawings.

DETAILED DESCRIPTION

Figure 1A:
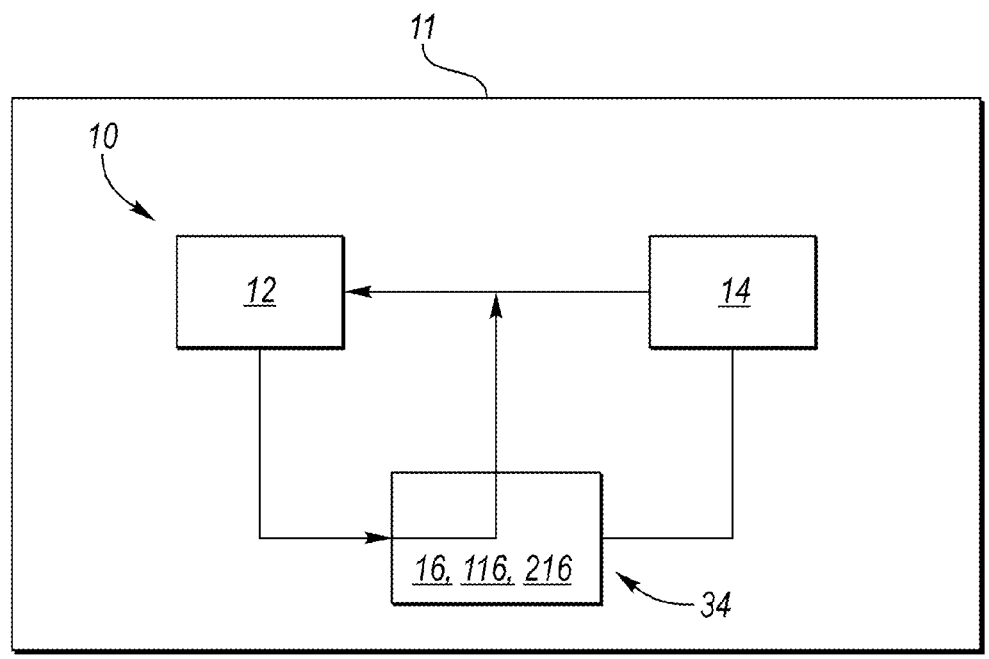
FIG. 1A is a schematic diagram of a transmission fluid circuit of a vehicle having a transmission, a cooler, and a valve in a first position such that fluid flows from the transmission, through the valve, and back into the transmission, bypassing the cooler.
Figure 1B:
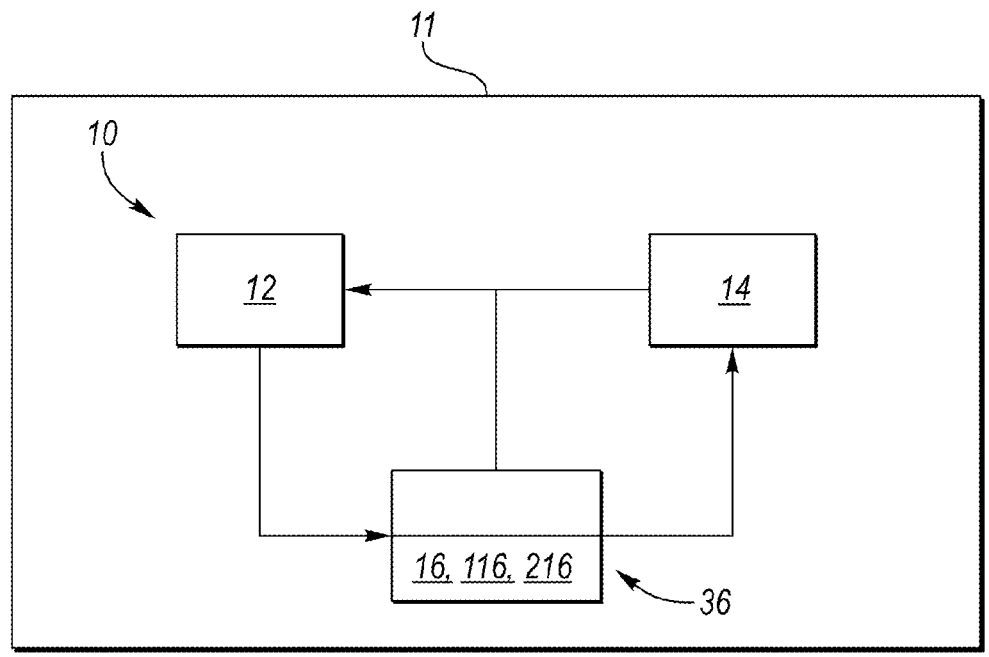
FIG. 1B is a schematic diagram of the fluid circuit of FIG. 1 with the valve in a second position such that fluid flows from the transmission, through the valve, through the cooler, and back into the transmission.

Referring to the figures, wherein like reference numerals refer to like elements, a transmission fluid circuit 10 is shown generally at 10 in FIGS. 1A and 1B. The transmission fluid circuit 10 includes a transmission 12, a cooler 14, and a valve 16. As will be explained in more detail below, the valve 16 is configured for regulating the circulation of a fluid 18 between the transmission 12 and the cooler 14. The fluid 18 may be an automatic transmission fluid (ATF), as understood by those skilled in the art. The transmission 12 may be an automatic transmission for a vehicle 11. The transmission 12 is configured for receiving and expelling the fluid 18.

The cooler 14 may be an automatic transmission fluid cooler 14, as understood by those skilled in the art. The cooler 14 is configured for receiving the fluid 18 from the valve 16 and expelling the fluid 18 to the transmission 12.

In order to cool the transmission 12 during operation, the valve 16 is configured to direct the flow of the fluid 18 received from the transmission 12 to the fluid cooler 14 and from the cooler 14 to the transmission 12 when the fluid 18 being expelled from the transmission 12 is at least at a first temperature (FIG. 1B). Likewise, when the fluid 18 being expelled from the transmission 12 is a sufficient number of degrees less than the first temperature, the valve 16 directs the fluid 18 being expelled from the transmission 12 back into the transmission 12, bypassing the cooler 14 (FIG. 1A). Therefore, the cooler 14 only operates when the fluid 18 is at least the first temperature, resulting in vehicle energy savings by preventing unnecessary operation of the cooler 14 when the fluid 18 is at temperatures less than the first temperature.

Figure 2A:
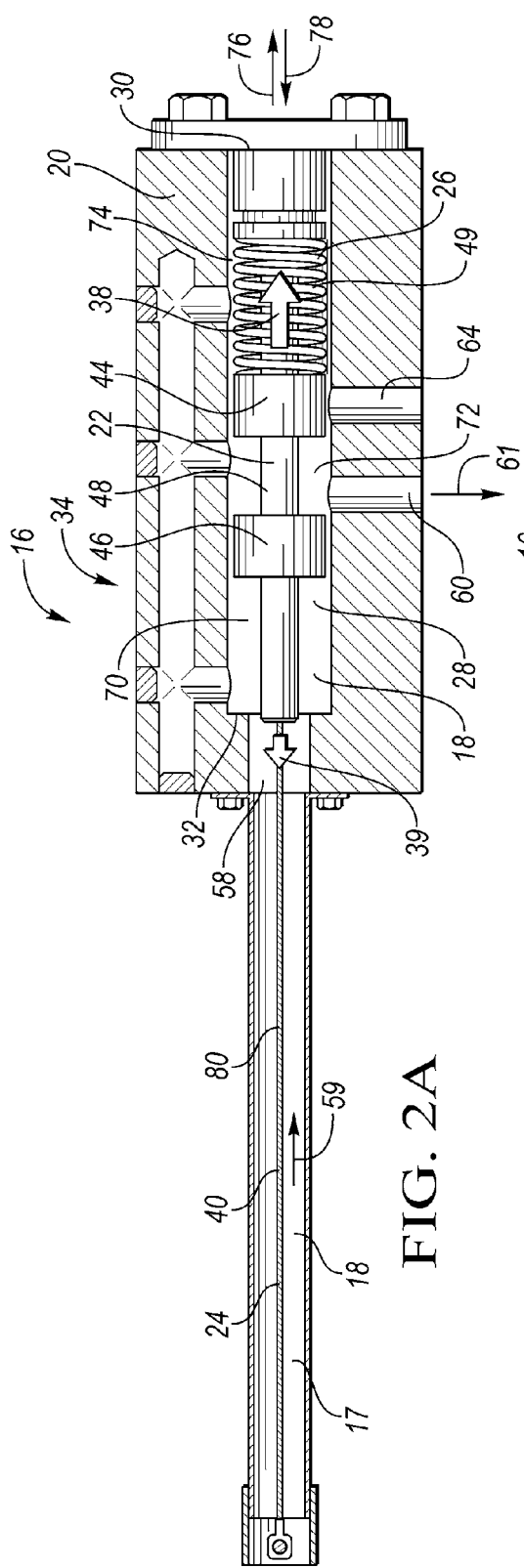
FIG. 2A is a schematic cross-sectional view of a first embodiment of the valve, shown in the first position.
Figure 2B:
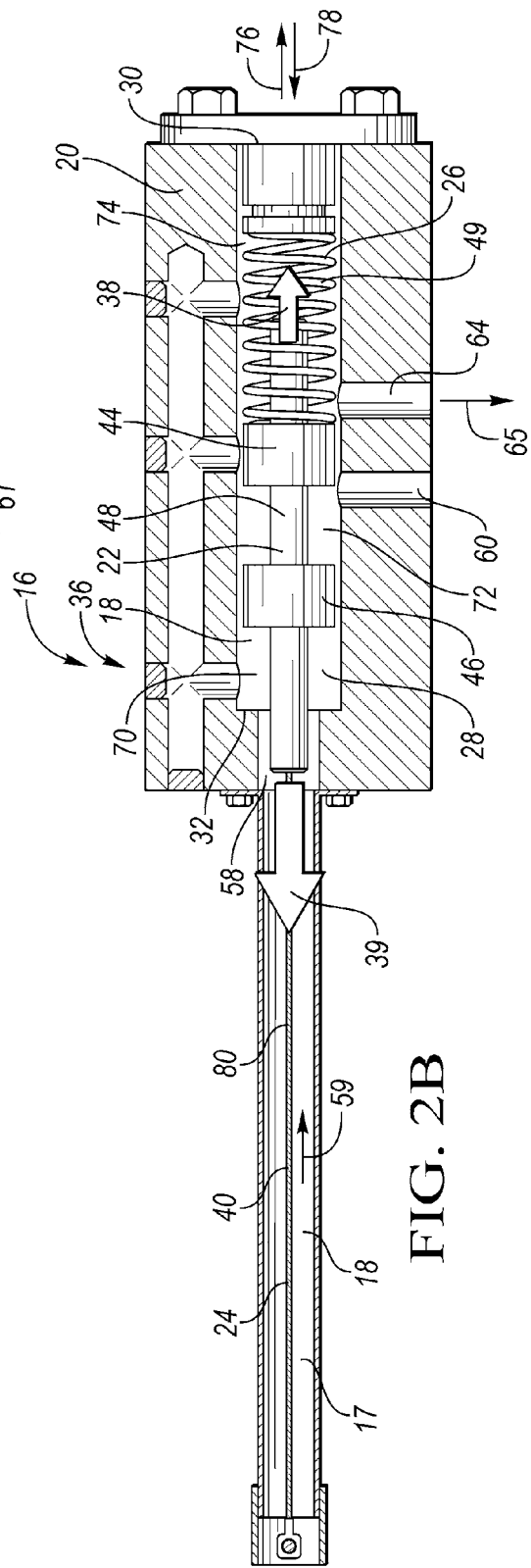
FIG. 2B is a schematic cross-sectional view of the valve of FIG. 2A, shown in the second position.

Referring generally to FIGS. 2A and 2B, the valve 16 includes a housing 20, a spool 22, an actuator 24, and a biasing device 26. The housing 20 defines a cavity 28 which extends longitudinally between a first end 30 and a second end 32. The cavity 28 is configured for receiving and expelling the fluid 18. The spool 22 is disposed in the cavity 28 and is movable longitudinally therein between a first position 34 (FIG. 2A) and a second position 36 (FIG. 2B). The fluid 18 is permitted to flow from the cavity 28 to the transmission 12 and from the transmission 12 to the cavity 28 when the spool 22 is in the first position 34. The fluid 18 is permitted to flow from the cavity 28 to the cooler 14, from the cooler 14 to the transmission 12, and from the transmission 12 to the cavity 28 when the spool 22 is in the second position 36. A fluid passage 17 is disposed in fluid communication between the valve 16 and the transmission 12.

The actuator 24 is configured to be operatively disposed in fluid communication with the fluid 18. The actuator 24 is attached to the spool 22. The actuator 24 is configured to move the spool 22 between the first position 34 and the second position 36. The actuator 24 includes a smart material 40, which may be a shape memory alloy (SMA) material which is configured to be activated, i.e. to be in a first state or an activated state, in response to the fluid 18 in the cavity 28 having at least the first temperature such that activation of the SMA material 40 activates the actuator 24. The SMA material 40 is configured to be deactivated, i.e., to be in a second state or a deactivated state, in response to the fluid 18 in the cavity 28 having a sufficient number of degrees less than the first temperature such that the SMA material 40 deactivates the actuator 24. More specifically, the SMA material 40 exhibits a temperature hysteresis in its phase transformations. The magnitude of the hysteresis is typically between five degrees and forty degrees Celsius (C). The specific magnitude of the hysteresis in a particular application is a function of several parameters, including the material formulation of the SMA material 40 and the stress state of the SMA material 40.

The SMA material 40 has a crystallographic phase changeable between austenite and martensite in response to exposure to a temperature of at least the first temperature and a temperature below the second temperature, which is typically lower than the first temperature. As used herein, the terminology SMA refers to alloys which exhibit a shape memory effect. That is, the SMA material 40 may undergo a solid state phase change via atomic rearrangement to shift between a martensite phase, i.e., "martensite", and an austenite phase, i.e., "austenite". Stated differently, the SMA material 40 may undergo a displacive transformation rather than a diffusional transformation to shift between martensite and austenite. A displacive transformation is when a structural change occurs by the coordinated movement of atoms (or groups of atoms) relative to their neighbors. In general, the martensite phase refers to the comparatively lower-temperature phase and is often more deformable than the comparatively higher-temperature austenite phase.

The temperature at which the shape memory alloy material begins to change from the austenite phase to the martensite phase is known as the martensite start temperature, $M_s$. The temperature at which the SMA material 40 completes the change from the austenite phase to the martensite phase is known as the martensite finish temperature, $M_f$. Similarly, as the SMA material 40 is heated, the temperature at which the SMA material 40 begins to change from the martensite phase to the austenite phase is known as the austenite start temperature, $A_s$. The temperature at which the SMA material 40 completes the change from the martensite phase to the austenite phase is known as the austenite finish temperature, $A_f$.

Therefore, the SMA material 40 may be characterized by a cold state, i.e., when a temperature of the SMA material 40 is below the martensite finish temperature $M_f$ of the SMA material 40. Likewise, the SMA material 40 may also be characterized by a hot state, i.e., when the temperature of the SMA material 40 is above the austenite finish temperature $A_f$ of the SMA material 40.

In operation, SMA material 40 that is pre-strained or subjected to tensile stress can change dimension upon changing crystallographic phase to thereby convert thermal energy to mechanical energy. That is, the SMA material 40 may change crystallographic phase from martensite to austenite and thereby dimensionally contract if pseudoplastically pre-strained so as to convert thermal energy to mechanical energy. Conversely, the SMA material 40 may change crystallographic phase from austenite to martensite and, if under stress, thereby dimensionally expand.

"Pseudoplastically pre-strained" refers to stretching the SMA material 40 while in the martensite phase so that the strain exhibited by the SMA material 40 under that loading condition is not fully recovered when unloaded, where purely elastic strain would be fully recovered. In the case of SMA material 40, it is possible to load the material such that the elastic strain limit is surpassed and deformation takes place in the martensitic crystal structure of the material prior to exceeding the true plastic strain limit of the SMA material 40. Strain of this type, between those two limits, is pseudoplastic strain, called such because upon unloading it appears to have plastically deformed, but when heated to the point that the SMA material 40 transforms to its austenite phase, that strain can be recovered, returning the SMA material 40 to the original length observed prior to being subjected to any applied loading.

The SMA material 40 may have any suitable composition. In particular, the SMA material 40 may include an element selected from the group including cobalt, nickel, titanium, indium, manganese, iron, palladium, zinc, copper, silver, gold, cadmium, tin, silicon, platinum, gallium, and combinations thereof. For example, suitable SMA materials 40 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations thereof. The SMA material 40 can be binary, ternary, or any higher order so long as the SMA material 40 exhibits a shape memory effect, e.g., a change in shape orientation, damping capacity, and the like.

In the embodiments shown in FIGS. 2A-4B, the SMA material 40 longitudinally contracts when activated or when in the activated state and longitudinally expands when deactivated or when in the deactivated state. The smart material 40 is configured as a straight wire 80. The straight wire 80 may be round in cross section. Other suitable cross sections may be used, including but not limited to, square, rectangular, and oval. The actuator 24 may also be a rod or any other actuator configured to longitudinally contract when actuated. Multiple wires or cable made of wires may also be used.

Referring now to the valve 16 shown in FIGS. 2A and 2B, the actuator 24 is activated by the temperature of the fluid 18 being at least equal to the first temperature. When the actuator 24 is activated, the actuator 24 applies an actuator force 39 to the spool 22 to move the spool 22 from the first position 34, shown in FIG. 2A, to the second position 36, shown in FIG. 2B. The fluid 18 is permitted to flow from the cavity 28 of the valve 16 to the cooler 14, from the cooler 14 to the transmission 12, and from the transmission 12 to the cavity 28 when the spool 22 is in the second position 36.

The actuator 24 is deactivated by the temperature of the fluid 18 being a sufficient number of degrees less than the first temperature. When the actuator 24 is deactivated, the spool 22 moves from the second position 36 to the first position 34. When the spool 22 is in the first position 34, the fluid 18 is only permitted to flow from the cavity 28 to the transmission 12 and from the transmission 12 to the cavity 28, bypassing the cooler 14.

The actuator 24 is configured as a straight wire 80 that includes the SMA material 40. The actuator 24 may also be configured as a rod, a coil spring (not shown), or any other actuator configured to longitudinally contract when actuated. The actuator 24 may be operatively disposed within the fluid passage 17. More specifically, the smart material 40 may be disposed in at least one of the fluid passage 17 and the cavity 28 and may be coaxial with a flow of fluid received from the transmission (arrow 59) received from the transmission 12 when the spool 22 is in both the first position 34 and the second position 36 such that the temperature of the entire smart material 40 is substantially equal to the temperature of the flow of fluid received from the transmission (arrow 59) when the spool is in both the first position 34 and the second position 36. The actuator 24 applies an actuator force 39 to the spool 22 when the actuator 24 is activated to move the spool 22 from the first position 34, shown in FIG. 2A, to the second position 36, shown in FIG. 2B.

The spool 22 is disposed in the cavity 28 and is movable longitudinally therein between the first position 34, shown in FIG. 2A, and the second position 36, shown in FIG. 2B. The straight wire 80 may be operatively disposed within the fluid passage 17 and is attached to the spool 22. The straight wire 80 is configured to apply an actuator force 39 to the spool 22. The spool 22 includes a first section 44, a second section 46, and an intermediate section 48. The first section 44 is longitudinally spaced from the second section 46. The intermediate section 48 connects the first section 44 to the second section 46. The first section 44 and the second section 46 are radially sized to fit within the cavity 28 such that the fluid 18 is prevented from passing within the cavity 28 between each of the first section 44 or the second section 46 and the housing 20. The intermediate section 48 is radially sized to be smaller than the first section 44 and second section 46 such that the fluid 18 is allowed to flow radially about the intermediate section 48, between the first section 44 and the second section 46.

The housing 20 defines the first inlet 58, a first outlet 60, and a second outlet 64 that are each in fluid communication with the cavity 28. The first inlet 58 is defined by the second end 32 of the housing 20 and provides fluid communication from the transmission 12 to a first portion 70 of the cavity 28 that is defined between the second section 46 and the second end 32 of the housing 20, opposite the intermediate section 48. A second portion 72 of the cavity 28 is defined between the first section 44 and the second section 46. The first outlet 60 provides fluid communication from the second portion 72 of the cavity 28 to the transmission 12 when the spool 22 is in the first position 34, as shown in FIG. 2A. A third portion 74 of the cavity 28 is defined between the first section 44 and the first end 30 of the housing 20. The second outlet 64 provides fluid communication from the third portion 74 of the cavity 28 to the cooler 14 when the spool 22 is in the second position 36, as shown in FIG. 2B. In the second position 36, once the fluid 18 passes through the cooler 14, the fluid 18 then flows to the transmission 12. More specifically, when the spool 22 is in the first position 34, shown in FIG. 2A, the first section 44 of the spool 22 blocks the fluid 18 from flowing to the second outlet 64, while leaving the first outlet 60 open to allow fluid communication from the second portion 72 of the cavity 28 to the transmission 12. Likewise, when the spool 22 is in the second position 36, shown in FIG. 2B, the first section 44 and the second section 46 of the spool 22 blocks fluid flow to the first outlet 60, while leaving the second outlet 64 open to allow fluid communication from the third portion 74 of the cavity 28 to the cooler 14. The first inlet 58 and the first and second outlets 60, 64 defined by the housing 20 may be configured as round holes, oval holes, or any suitable configuration. The passages defined in the housing 20 that lead to the first inlet 58 and the first and second outlets 60, 64 may be straight, stepped, or any other suitable configuration.

Referring specifically to FIG. 2A, the fluid 18 is at a temperature that is a sufficient number of degrees less than the first temperature and the smart material 40 is deactivated, such that the straight wire 80 is longitudinally extended by the biasing device 26. The biasing device 26 is operatively disposed in the cavity 28 between the first section 44 of the spool 22 and the housing 20. The biasing device 26 may be an extension spring 49 or may be any other suitable biasing device. The biasing device 26 continuously applies a bias force 38 on the first section 44 of the spool 22 in a first longitudinal direction 76, opposite a second longitudinal direction 78, to move the spool 22 to the first position 34 when the actuator 24 is deactivated. In another embodiment, the valve 16 may also be configured so that the biasing device 26 may be a compression spring that continuously acts on the second section 46 of the spool 22 in the first longitudinal direction 76.

Referring to FIG. 2B, the fluid 18 is at a temperature that is at least equal to the first temperature and the smart material 40 is activated, such that it longitudinally contracts. This causes the actuator 24 to act on the spool 22 in the second longitudinal direction 78 to move the spool 22 to the second position 36. The spool 22 moves in the second longitudinal direction 78 from the first position 34 to the second position 36 when an actuator force 39, resulting from the activation of the smart material 40 acting on the spool 22 in the second longitudinal direction 78, exceeds the bias force 38 of the biasing device 26 acting on the spool 22 in the first longitudinal direction 76. In the second position 36, the fluid 18 flows out of the third portion 74 of the cavity 28, through the second outlet 64, and into the cooler 14 in a flow of fluid to the cooler (arrow 65). The fluid 18 that flows through the cooler 14 is cooled by the cooler 14 and then flows from the cooler 14, back into the transmission 12.

Referring again to FIG. 2A, the spool 22 moves in the first longitudinal direction 76 from the second position 36 to the first position 34 when the actuator force 39, resulting from deactivation of the smart material 40 acting on the spool 22 in the second longitudinal direction 78, is less than the bias force 38 of the biasing device 26 acting on the spool 22 in the first longitudinal direction 76. In the first position 34, the fluid 18 flows out of the second portion 72 of the cavity 28, through the first outlet 60, and into the transmission 12 in a flow of fluid to the transmission (arrow 61).

Figure 3A:
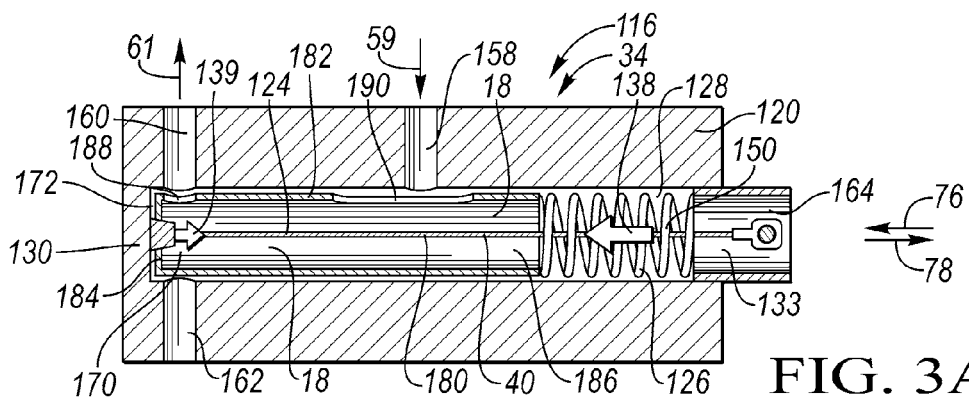
FIG. 3A is a schematic cross-sectional view of a second embodiment of the valve, shown in the first position.
Figure 3B:
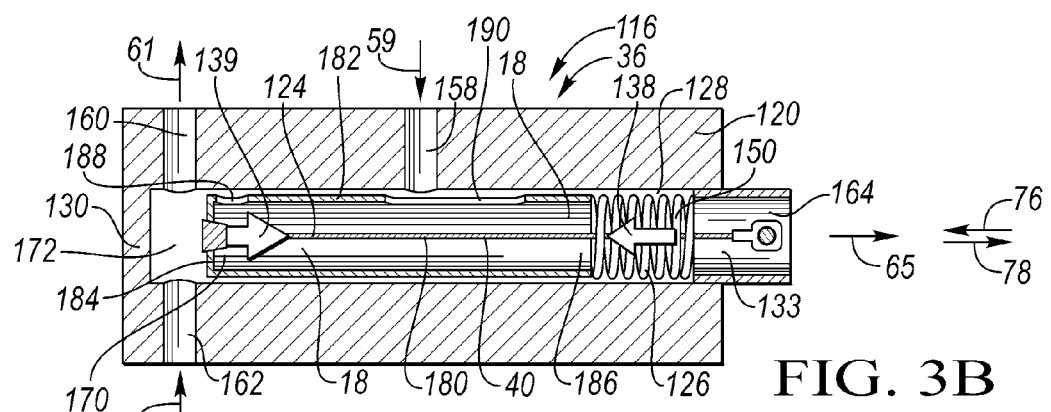
FIG. 3B is a schematic cross-sectional view of the valve of FIG. 3A, shown in the second position.

A second embodiment of the valve 116 is shown in FIGS. 3A and 3B. The housing 120 defines a cavity 128 having a closed end 130 and an open end 133. The cavity 128 extends longitudinally between the closed end 130 and the open end 133. The open end 133 may have the same diameter as the cavity 128. The cavity 128 is configured for receiving and expelling the fluid 18. A hollow shuttle 182 has a closed end 184 and is configured to form an open end 186 and a hole 188. The hollow shuttle 182 is disposed in the cavity 128 and is movable longitudinally therein between the first position 34, shown in FIG. 3A, and the second position 36, shown in FIG. 3B. The hollow shuttle 182 may also be configured to form a slot 190. The hole 188 formed by the hollow shuttle 182 may be configured as a round hole, a slot, or any other suitable configuration.

An actuator 124 is configured to be operatively disposed in the fluid 18 and in communication with the fluid 18. The actuator 124 is attached to the hollow shuttle 182 and is configured to move the hollow shuttle 182 between the first position 34, shown in FIG. 3A, and the second position 36, shown in FIG. 3B. The smart material 40 may be configured as a straight wire 180, as shown. The smart material may also be configured as a coil spring (not shown), which may be disposed on either end of the hollow shuttle 182.

The actuator 124 is activated by the temperature of the fluid 18 being at least equal to the first temperature. When the actuator 124 is activated, the actuator 124 applies an actuator force 139 to the hollow shuttle 182 to move the hollow shuttle from the first position 34, shown in FIG. 3A, to the second position 36, shown in FIG. 3B. The fluid 18 is permitted to flow from the cavity 128 of the valve 116 to the cooler 14, from the cooler 14 to the transmission 12, and from the transmission 12 to the cavity 128 when the hollow shuttle 182 is in the second position 36.

The actuator 124 is deactivated by the temperature of the fluid 18 being a sufficient number of degrees less than the first temperature. When the actuator 124 is deactivated, the hollow shuttle 182 moves from the second position 36 to the first position 34. When the hollow shuttle 182 is in the first position 34, the fluid 18 is only permitted to flow from the cavity 128 to the transmission 12 and from the transmission 12 to the cavity 128, bypassing the cooler 14.

The fluid 18 is permitted to flow from the cavity 128 to the transmission 12 and from the transmission 12 to the cavity 128 when the hollow shuttle 182 is in the first position, shown in FIG. 3A. The fluid 18 is permitted to flow from the cavity 128 to the cooler 14, from the cooler 14 to the transmission 12, and from the transmission 12 to the cavity 128 when the hollow shuttle 182 is in the second position 38, shown in FIG. 3B.

The smart material 40 is disposed in the cavity 128 and is substantially coaxial with the flow of the fluid 18 received from the transmission 12 when the hollow shuttle 182 is in both the first position 34 and the second position 36 such that the temperature of the entire smart material 40 is substantially equal to the temperature of the flow of the fluid 18 received from the transmission 12 when the hollow shuttle 182 is in both the first position 34 and the second position 36.

The hollow shuttle 182 is radially sized to fit within the cavity 128 such that the fluid 18 is prevented from passing within the cavity 128 between the open end 186 and the closed end 184 of the hollow shuttle 182.

The valve 116 may include a biasing device 126 disposed in the cavity 128. The biasing device 126 may be a compression spring 150, as shown, or any other suitable biasing device. The biasing device 126 continuously applies a bias force 138 to the hollow shuttle 182 in a first longitudinal direction 76 to move the hollow shuttle 182 to the first position 34 when the actuator 124 is deactivated. The actuator 124 acts on the hollow shuttle 182 in a second longitudinal direction 78, opposite the first longitudinal direction 76, to move the hollow shuttle 182 to the second position 36 when the actuator 124 is activated.

The hollow shuttle 182 moves in the second longitudinal direction 78 from the first position 34, shown in FIG. 3A, to the second position 36, shown in FIG. 3B, when the actuator force 139 resulting from the activation of the smart material 40 acting on the hollow shuttle 182 in the second longitudinal direction 78 exceeds the bias force 138 of the biasing device 126 acting on the hollow shuttle 182 in the first longitudinal direction 76. The hollow shuttle 182 moves in the first longitudinal direction 76 from the second position 36, shown in FIG. 3B, to the first position 34, shown in FIG. 3A, when the actuator force 139, resulting from deactivation of the smart material 40 acting on the hollow shuttle 182 in the second longitudinal direction 78, is less than the bias force 138 of the biasing device 126 acting on the hollow shuttle 182 in the first longitudinal direction 76.

The housing 120 defines a first inlet 158, a first outlet 160, a second inlet 162, and a second outlet 164 that are each in fluid communication with the cavity 128. The first inlet 158 provides fluid communication between the transmission 12 and a first portion 170 of the cavity 128 that is defined between the closed end 184 of the hollow shuttle 182 and the open end 133 of the housing 120. The first inlet 158 may be located in any position that provides fluid communication from the transmission 12 to the first portion 170 of the cavity 128 when the hollow shuttle 182 is in both the first position 34 and the second position 36. The first inlet 158 may be located adjacent to the slot 190 in the hollow shuttle 182. The second outlet 164 provides fluid communication between the first portion 170 of the cavity 128 and the cooler 14. The second outlet 164 may be located at the open end 133 of the cavity 128. The second outlet 164 may also be located in any other position that provides fluid communication from the first portion 170 of the cavity 128 to the cooler 14. The second inlet 162 provides fluid communication between the cooler 14 and a second portion 172 of the cavity 128 defined between the closed end 184 of the shuttle 182 and the closed end 130 of the housing 120 only when the hollow shuttle 182 is in the second position 36, shown in FIG. 3B. The first outlet 160 provides fluid communication from the first portion 170 of the cavity 128 and the transmission 12 only when the hollow shuttle 182 is in the first position 34. The first outlet 160 provides fluid communication between the second portion 172 of the cavity 128 and the transmission 12 only when the hollow shuttle 182 is in the second position 36. More specifically, when the hollow shuttle 182 is in the first position 34, shown in FIG. 3A, the hollow shuttle 182 blocks the second inlet 162, while leaving the first inlet 158, the first outlet 160, and the second outlet 164 open to the first portion 170 of the cavity 128. When the hollow shuttle 182 is in the second position 36, shown in FIG. 3B, the hollow shuttle 182 leaves the first inlet 158 and the second outlet 164 open to the first portion 170 of the cavity 128, while leaving the first outlet 160 and the second inlet 162 open to the second portion 172 of the cavity 128. The first and second inlets 158, 162 and the first and second outlets 160, 164 defined by the housing 120 may be configured as round holes, as shown, oval holes, or any other any suitable configuration. The passages defined in the housing 120 that lead to the first and second inlets 158, 162 and the first and second outlets 160, 164 may be straight, stepped, or any other suitable configuration.

The straight wire 180 is disposed in the first portion 170 of the cavity 128 and is in fluid communication with the flow of the fluid 18 received from the transmission 12 in the first portion 170 of the cavity 128 when the hollow shuttle 182 is in both the first position 34 and the second position 36. When the fluid 18 is at a temperature that is a sufficient number of degrees less than the first temperature, the smart material 40 is in a deactivated state. Likewise, when the fluid 18 is at a temperature that is greater than the first temperature, the smart material 40 is in an activated state.

In the first position 34, shown in FIG. 3A, the fluid 18 is permitted to flow from the transmission 12 into the first portion 170 of the cavity 128 in the flow of fluid received from the transmission (arrow 59) and from the first portion 170 of the cavity 128 to the transmission 12 in the flow of fluid to the transmission (arrow 61). The fluid 18 is prevented from flowing from the cooler 14 and into the cavity 128 and thus from the cavity 128 to the cooler 14.

In the second position 36, as shown in FIG. 3B, the fluid 18 is permitted to flow from the transmission 12 into the first portion 170 of the cavity 128 in the flow of fluid received from the transmission (arrow 59), from the first portion 170 of the cavity 128 to the cooler 14 in the flow of fluid to the cooler (arrow 65), from the cooler 14 to the second portion 172 of the cavity 128 in a flow of fluid received from the cooler (arrow 63), and from the second portion 172 of the cavity 128 to the transmission 12 in the flow of fluid to the transmission (arrow 61).

Figure 4A:
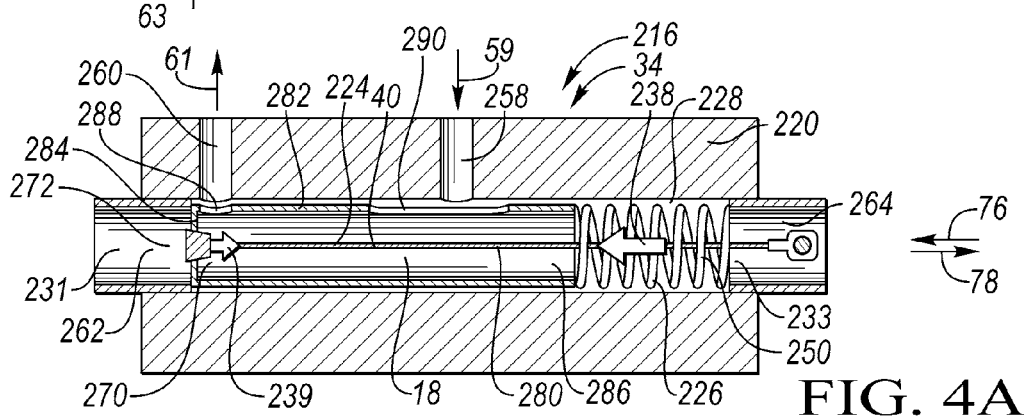
FIG. 4A is a schematic cross-sectional view of a third embodiment of the valve, shown in the first position.
Figure 4B:
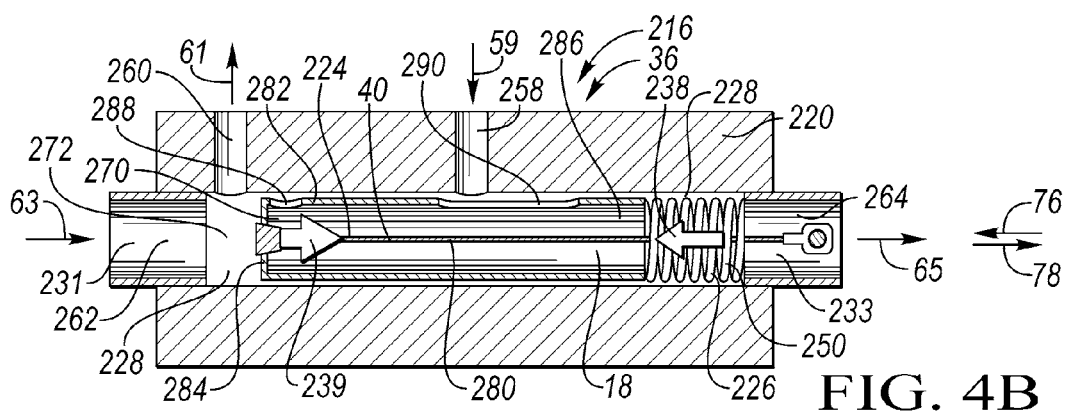
FIG. 4B is a schematic cross-sectional view of the valve of FIG. 4A, shown in the second position.

A third embodiment of the valve 216 is shown in FIGS. 4A and 4B. This embodiment is similar to the second embodiment of the valve 116, except that a housing 220 defines a cavity 228 having a first open end 231 and a second open end 233. The cavity 228 extends longitudinally between the first open end 231 and the second open end 233. A second inlet 262 is located at the first open end 231, and a second outlet 264 is located at the second open end 233. One of the first open end 231 and the second open end 233 may have the same diameter as the cavity 228. The valve 216 is similar in operation to the valve 116.

While the best modes for carrying out the many aspects of the present teachings have been described in detail, those familiar with the art to which these teachings relate will recognize various alternative aspects for practicing the present teachings that are within the scope of the appended claims.

The invention claimed is:
1. A transmission fluid circuit for regulating a flow of a fluid, the transmission fluid circuit comprising:
   a transmission configured for receiving and expelling the fluid;
   a cooler configured for receiving and expelling the fluid; and
   a valve configured for directing the flow of the fluid received from the transmission to one of the transmission and the cooler, the valve including:
      a housing defining a cavity extending longitudinally between a first end and a second end, wherein the cavity is configured for receiving and expelling the fluid;
      a spool disposed in the cavity and movable longitudinally therein between a first position and a second position;
      an actuator attached to the spool and including a smart material configured as a straight wire and disposed in the fluid;
      a biasing device disposed in the cavity and attached to the spool; and
      a fluid passage for containing the flow of the fluid from the transmission to the cavity;
   wherein the straight wire of smart material is disposed in the fluid passage and is coaxial with the flow of the fluid from the transmission to the cavity when the spool is in both the first position and the second position such that the temperature of the entire straight wire of smart material is substantially equal to the temperature of the fluid flowing from the transmission to the cavity when the spool is in both the first position and the second position;

wherein the actuator is configured to move the spool from the first position to the second position;

wherein the smart material is configured to be in an activated state in response to the fluid being at least a first temperature such that the activated smart material causes the actuator to move the spool to the second position;

wherein the smart material is configured to be in a deactivated state in response to the fluid being a sufficient number of degrees less than the first temperature such that the deactivated smart material allows the biasing device to move the spool to the first position;

wherein the fluid is permitted to flow from the cavity to the transmission and from the transmission to the cavity when the spool is in the first position; and wherein the fluid is permitted to flow from the cavity to the cooler, from the cooler to the transmission, and from the transmission to the cavity when the spool is in the second position.

2. The transmission fluid circuit of claim 1, wherein the spool includes:
   a first section;
   a second section longitudinally spaced from the first section; and
   an intermediate section longitudinally disposed between the first section and the second section;

wherein the first section and the second section are radially sized to fit within the cavity such that fluid is prevented from passing within the cavity between each of the first section and the second section and the housing; and wherein the intermediate section is radially sized to be smaller than the first section and the second section such that the fluid is allowed to flow radially about the intermediate section and the housing, between the first section and the second section.

3. The transmission fluid circuit of claim 2, wherein the biasing device continuously applies a bias force to the spool in a first longitudinal direction;

wherein the actuator acts on the spool in a second longitudinal direction, opposite the first longitudinal direction;

wherein the spool moves in the second longitudinal direction from the first position to the second position when an actuator force resulting from the activated smart material acting on the spool in the second longitudinal direction exceeds the bias force of the biasing device acting on the spool in the first longitudinal direction; and wherein the spool moves in the first longitudinal direction from the second position to the first position when an actuator force resulting from deactivated smart material acting on the spool in the second longitudinal direction is less than the bias force of the biasing device acting on the spool in the first longitudinal direction.

* * * * *